J. F. PRIBNOW.
SAW SWAGE.
APPLICATION FILED MAY 17, 1920.

1,382,743. Patented June 28, 1921.

Witness
Frank A. Sable

Inventor
John F. Pribnow,
By
Hood & Schley
Attorneys

UNITED STATES PATENT OFFICE.

JOHN F. PRIBNOW, OF INDIANAPOLIS, INDIANA, ASSIGNOR TO E. C. ATKINS & COMPANY, OF INDIANAPOLIS, INDIANA, A CORPORATION OF INDIANA.

SAW-SWAGE.

1,382,743.

Specification of Letters Patent.   Patented June 28, 1921.

Application filed May 17, 1920. Serial No. 381,998.

*To all whom it may concern:*

Be it known that I, JOHN F. PRIBNOW, a citizen of the United States, residing at Indianapolis, in the county of Marion and State of Indiana, have invented a new and useful Saw-Swage, of which the following is a specification.

It is the object of my invention to make easier the operation of saw swages. In the ordinary saw swage, the force which is required for the swaging operation produces a great increase in the friction in the relatively moving parts upon one another, so that the force to overcome this friction as well as the force required for the swaging operation proper must be exerted by the operator in working the device.

According to my present invention I reduce this friction very materially, by providing roller or other anti-friction bearings between the surfaces which move upon one another, and at the same time modify other features of the swage so that the swage bar or die is maintained accurate in its movements and adjustable to various longitudinal positions.

The present invention is in many respects an improvement and development of the saw swage shown in my prior Patent No. 1,284,141, granted November 5, 1918.

Figure 1:
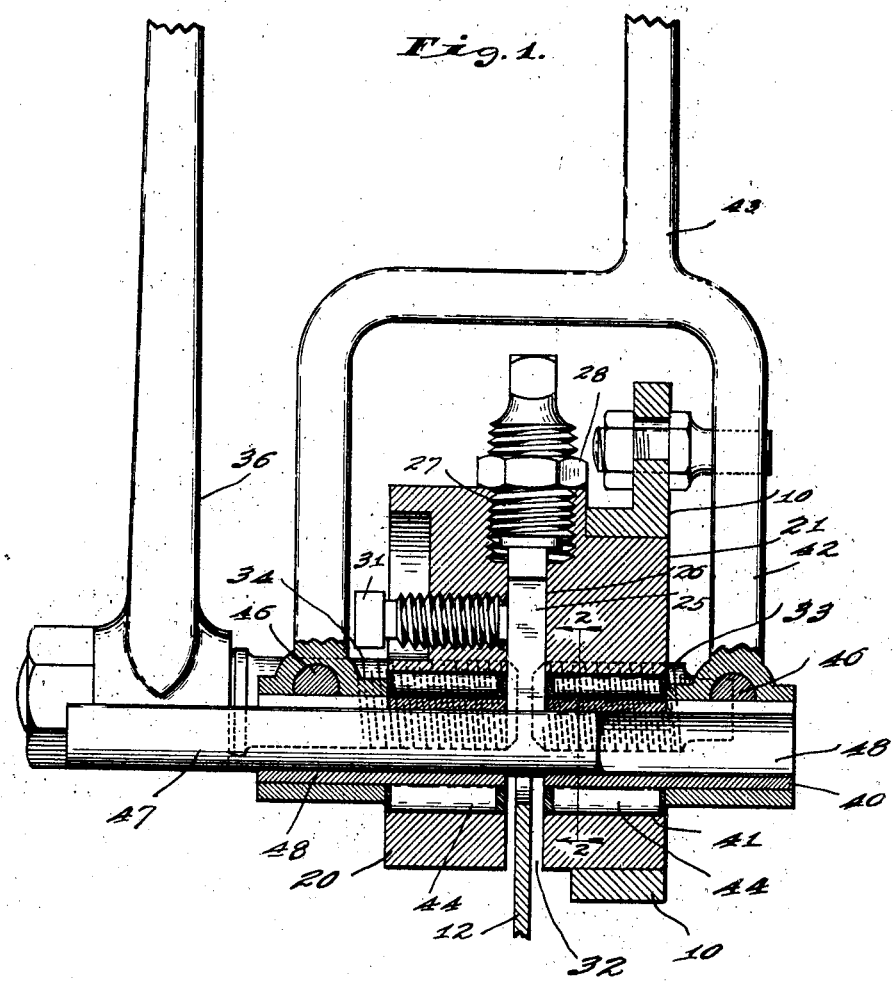
Figure 2:
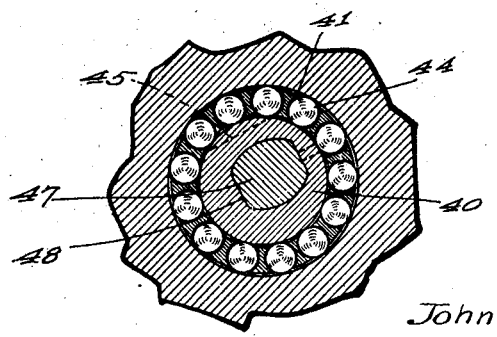

The accompanying drawing illustrates my invention: Figure 1 is a transverse sectional view through a saw swage embodying my invention, being taken in the plane of the swaging die; and Fig. 2 is a section on the line 2—2 of Fig. 1.

The general construction of the saw swage is similar to that shown in my aforesaid patent. There is a frame 10 which is set to one side of the plane of the saw 12 to be swaged, which frame has guides for coöperating with the saw to position the swage. A swage block 20 extending across the plane of the saw 12 has a cylindrical end 21, which fits within an annular portion of the frame 10 and is clampable therein in any desired circumferential position, by mechanism such as shown in the aforesaid patent. An anvil 25 is mounted in a nearly radial hole 26 in the swage block, which anvil is adjustable along said hole by an adjusting screw 27 provided with a lock nut 28, and when suitably adjusted is locked in place by a clamping screw 31. The swage block is bifurcated, to provide in its lower portion a slot 32 to receive the saw being swaged. The anvil 25 and hole 26 are in the plane of this slot and of the saw, and the working end of the anvil projects into the slot 32 to abut against the top of the saw tooth being swaged. Two clamping screws 33 and 34 are mounted in the axial ends of the swage block 20, and project into the slot 32 to engage the side faces of the saw at the base of the tooth being swaged to hold the saw in position for swaging. The screw 33 is adjustable to any desired setting, and the screw 34 is provided with a clamping lever 36 whereby it may be operated quickly and conveniently to clamp the saw and release it. The structure so far described is all similar to that shown in my aforesaid patent.

Two bushings 40 are mounted in alined bushing holes 41 in the two axial ends of the swage block 20, and project from the slot 32 outward in opposite directions beyond the end faces of the swage block to have mounted thereon the two prongs 42 of a bifurcated operating lever 43, so that by the operation of said lever 43 the two bushings 40 are turned correspondingly. That part of each bushing 40 which projects beyond the end of the swage block is longitudinally split, but the portion which is located within the hole 41 is not split. Between the outside of the latter portion of each bushing and the hole 41, both of which are cylindrical, is located an annular roller bearing 44. The split outer end of each bushing 40 has a flat face 45, to coöperate with a clamping bolt 46 mounted within the corresponding prong 42 of the operating lever 43. The clamping bolts 46 are conveniently of the type shown in my prior Patent No. 1,176,985, granted March 28, 1916, and are tightened or loosened to cause the split ends of the bushing 40 to grip or release the swaging die 47 mounted within said bushing and extending across the slot 42. The swaging die or swage bar 47 is a straight bar of uniform cross-section throughout, and is received in alined holes 48 in the bushings, these holes corresponding to the die in shape and size of cross-section and extending longitudinally through the bushings. Thus the die 47 is supported on both sides of the slot 32, and by loosening the clamping bolts 46 may be adjusted longitudinally within the bushings to bring different portions of the die into working position in the slot 32, but this clamping action of the split outer ends of the bushings 40 to hold the die in proper position does not interfere with the effective coöperation of the cylindrical outer surface of the un-split inner ends of such bushings with the roller bearings 44. In some positions of the swaging die 47 it is clamped at only one end, as it is in the position shown in Fig. 1 of the drawings; but this is sufficient, and even in such cases the die is supported in bushings on both sides of the slot 32 and is turned from both sides of such slot by the action of the two prongs 42 and of the two bushings 40.

The present invention is not concerned with the precise shape of the die in cross-section, or with the precise location of the die transversely of the bushings.

The operation of the device is in general the same as that of the saw swage shown in my aforesaid Patent No. 1,284,141, save that by reason of the roller bearing mounting of the bushings 40 in the swage block the swaging operation is made materially easier for the operator, and the strain on the parts of the swage is reduced. Because of this, the swage may be made lighter, with less danger of being broken in use, and the operator can do more work with less effort and continue it for a longer time without excessive fatigue.

I claim as my invention:

1. A saw swage, comprising a swage block, alined bushings mounted in holes in said swage block, roller bearings between said bushings and the walls of said holes, a swaging die mounted in said alined bushings, and means for turning a bushing and through it turning the swaging die.

2. A saw swage, comprising a swage block, alined bushings mounted in holes in said swage block, roller bearings between said bushings and the walls of said holes, a swaging die mounted in said alined bushings, and common means for turning both said bushings and through them turning said swaging die.

3. A saw swage, comprising a swage block, alined bushings mounted in holes in said swage block and projecting therefrom, roller bearings between said bushings and the walls of said holes, a swaging die mounted in said alined bushings, a bifurcated operating arm the two prongs of which are connected to the projecting ends of said two bushings, the parts of the bushings in said holes being unsplit and the projecting parts being split, and means coöperating with said split projecting parts for clamping them on said swaging die.

4. A saw swage, comprising a swage block, alined bushings mounted in holes in said swage block, roller bearings between said bushings and the walls of said holes, a swaging die mounted in said alined bushings, said bushings having split and unsplit portions, the unsplit portions coöperating with said roller bearings, and clamping means coöperating with the split portions for clamping them on the swaging die, and means for turning said bushings and through them turning the swaging die.

5. A saw swage, comprising a swage block, alined bushings mounted in holes in said swage block, roller bearings between said bushings and the walls of said holes, a swaging die mounted in said alined bushings, the parts of said bushings coöperating with said roller bearings being unsplit but a bushing being provided with a split portion, and clamping means coöperating with said split portion to clamp the swaging die in place therein, and means for turning a bushing and through it turning the swaging die.

6. A saw swage, comprising a swage block, a swaging die rotatably mounted in said swage block, and roller bearings supporting said swaging die in said swage block and through which the thrust of said swaging die is transmitted to said swage block.

7. A saw swage, comprising a swage block, a swaging die rotatably mounted in said swage block, roller bearings supporting said swaging die in said swage block and through which the thrust of said swaging die is transmitted to said swage block, and a bifurcated operating arm the two prongs of which coöperate with said swaging die on opposite sides of the swaging point thereof so that the die is operated from both ends.

In witness whereof I have hereunto set my hand at Indianapolis, Indiana.

JOHN F. PRIBNOW.